(12) United States Patent
Farr et al.

(10) Patent No.: US 7,827,478 B2
(45) Date of Patent: Nov. 2, 2010

(54) DYNAMIC GENERATION OF FORM PAGES FOR ACCESSING A DATABASE

(76) Inventors: William Farr, 5207 Heather La., Park City, UT (US) 84098; Scot Penrod, 3968 N. 2800 West, Farr West, UT (US) 84404

( * ) Notice: Subject to any disclaimer, the term of this patent is extended or adjusted under 35 U.S.C. 154(b) by 623 days.

(21) Appl. No.: 11/222,078

(22) Filed: Sep. 8, 2005

(65) Prior Publication Data

US 2007/0055924 A1 Mar. 8, 2007

(51) Int. Cl.
*G06F 17/00* (2006.01)
(52) U.S. Cl. .................. 715/222; 715/738; 715/745; 715/760; 715/762; 707/706; 707/736
(58) Field of Classification Search .............. 715/202, 715/206, 221, 222, 234, 738, 745, 760, 762, 715/810
See application file for complete search history.

(56) References Cited

U.S. PATENT DOCUMENTS

| | | | | |
|---|---|---|---|---|
| 5,550,971 A | * | 8/1996 | Brunner et al. ............... 707/3 |
| 6,738,077 B1 | * | 5/2004 | Wendker et al. ............ 715/744 |
| 6,820,235 B1 | * | 11/2004 | Bleicher et al. ............. 715/236 |
| 6,968,503 B1 | * | 11/2005 | Chang et al. ................ 715/202 |
| 7,062,502 B1 | * | 6/2006 | Kesler ........................ 707/102 |
| 7,246,326 B2 | * | 7/2007 | Haley ......................... 715/762 |
| 2003/0030676 A1 | * | 2/2003 | Iyer ............................ 345/810 |
| 2005/0149852 A1 | * | 7/2005 | Bleicher et al. ........... 715/501.1 |
| 2006/0106897 A1 | * | 5/2006 | Sapozhnikov et al. ....... 707/204 |
| 2006/0288274 A1 | * | 12/2006 | Bustelo et al. .............. 715/513 |

* cited by examiner

*Primary Examiner*—Laurie Ries
*Assistant Examiner*—James H Blackwell
(74) *Attorney, Agent, or Firm*—Workman Nydegger

(57) ABSTRACT

Systems and methods for generating dynamic form pages for accessing a database. An item model is stored in the database and defines attributes or characteristics of item types. The item model is separate from the actual data and from the data model. When a form page is requested, the page is dynamically generated by accessing the item model based on the requested form. The page is then displayed to the user. Data can be included in the page as necessary. Form pages can be generated on the fly and can automatically adapt to changes in the definition of the item model.

25 Claims, 12 Drawing Sheets

Webpage

Contract List

| RFP No. | Contract Number | Project | Contractor Name |
|---|---|---|---|
| X-123-456789 | Contract 1 | Type A | CONTRACTOR A |
| X000-39-04-C-12 | Contract 2 | Type B | CONTRACTOR B |
| X-223-456846 | Contract 3 | Type A | CONTRACTOR C |
| X011-39-05-C-19 | Contract 4 | Type B | CONTRACTOR D |

Showing records 1 through 4 of 4

Export All    Search    Insert    ?

804 — (header row)
802 — Data about contracts
810

801

Example: Item List Page Search Results

Figure 8

Webpage

Item Types

| Type | Name | SubType(s) |
|---|---|---|
| contract | Contract | contract, measure |

Tabs | Display | Buttons | Rules
Properties

Item Display Label Properties — 1002

| | |
|---|---|
| Sub Type: | contract |
| Label Name: | Contract |
| Item Relation Flag | N |
| Word Export | 1447propertiesword.aspx |
| Agenda Items | N |

Fields — 1003

1004 — 1006 — 1008 — 1010 — 1012 — 1014 / Insert

| Field Name | Display Name | Required | Listed | Feild Type | Sort Order |
|---|---|---|---|---|---|
| rfpno | RFP No. | Y | Y | Text | 10 |
| contractnumber | Contract Number | N | Y | Text | 20 |
| revisionnumber | Revesion No. | N | Y | Text | 30 |
| title | Title | N | Y | Text | 40 |

Edit   Done

List   View

Item Type Fields   1001

Figure 10

DYNAMIC GENERATION OF FORM PAGES FOR ACCESSING A DATABASE

CROSS-REFERENCE TO RELATED APPLICATIONS

Not Applicable.

BACKGROUND OF THE INVENTION

1. The Field of the Invention

Embodiments of the present invention relate to systems and methods for accessing a database. More particularly, embodiments of the present invention relate to systems and methods for dynamically generating form pages for accessing a database.

2. Background and Relevant Art

Computers have become an integral part of everyday life and are essential components of personal and professional life. One of the advantages afforded by computers is the ability to store and access a large amount of data. Some of the data, such as data found on the Internet, is accessible to anyone with a computer. Other data, such as data maintained by a business, is proprietary and only accessible to those that have the proper credentials.

In either case, the data is often stored using various types of data structures and one of the more common data structures used to store data is a database (dB). Generally stated, a database is a collection of information and at least some of the data stored in a database is related. In fact, a database is typically constructed to organize the data in a manner that makes the data accessible to users in a convenient manner. Because a database can store a large amount of information and because it is often necessary to perform various functions on the data stored in the database, the ability to quickly access the data is important. Thus, one goal of a database is to make the data stored therein available in a logical and convenient manner.

The tasks performed on a database include, for example, adding new data, deleting data, and updating or editing data. In addition to these tasks, a database should also be searchable. The ability to search a database can be one of its most used features. Searching a database enables a user to find related data or to find multiple instances of data that share common characteristics or attributes. Thus, the organization and structure of a database can have an impact on how easily the data can be accessed.

One type of database in use today is a relational database. Data in a relational database is often stored in the form of tables, which are usually arranged in the form of rows and columns. Using these related tables, the data can be organized to establish relationships in the data. At the same time, the data can be accessed based on the same relationships.

The data in a relational database is often referred to as an object. The rows in a database table store the data for an object, and the columns in a database table represent the attributes of the object data. The attributes are also referred to as fields. When an object is accessed (e.g., added, edited, deleted, or searched), a form is typically used. A form, for example, is a graphical representation of the tables in the database. A form has fields (table columns) and data (table rows) displayed on it along with buttons that when invoked execute tasks on the object. Using a form, a user can add, edit, update, delete, and search the objects in the database. A form has the advantage of visually presenting the information in the database in a manner that makes accessing the database easier.

One of the problems with a database, however, is that the objects stored in a database are not identical. In other words, the form designed for one object may not be adequate for use with another object. The differences between objects effectively compels the creation of a new form needs for each object. When one considers that a database may contain hundreds or thousands of different objects, the task of creating the forms becomes rather difficult and costly. The problem becomes even more difficult because a form used to add an object, may not be the same as the form used to delete or search for an object. In other words, more than one form needs to be created for each object.

If a database has, for example, five different forms (insert form, delete form, add form, search form, and relate form) for each object, it becomes clear that there is a need for 500 forms when the database contains 100 unique objects. While the creation of the forms may be accomplished over time, it is clear that the creation of forms is not trivial. Further, problems begin to appear when the objects' attributes change, due to a business requirement change, and require a corresponding change in the forms. Because even a small change can have a substantial impact on other aspects of a database, typical changes are proposed, approved, and tested before being implemented. In other words, improvements to a database can result in lots of changes and has a corresponding cost in terms of time, database maintenance, money, and subsequent worker productivity.

BRIEF SUMMARY OF THE INVENTION

Embodiments of the invention overcome these and other problems and relate to systems and methods for dynamically generating forms for accessing a database. The dynamic generation of forms or form pages uses an item model, which is itself stored in the database. The item model effectively defines an object. The information in the item model is used as the form is generated to identify, by way of example, the fields, buttons, rules, rights, history, and tabs to include in the generated form page.

The specific combination of fields, buttons, rules, rights, history, and tabs may depend on the type of form page being generated. Exemplary form pages include a properties page, a edit page, an insert page, a delete page, a search page, and a relate page. Using the type of form page requested and an item type, the appropriate item model can be accessed to identify the appropriate combination of fields, buttons, rules, rights, history, and tabs. Thus, different forms may include different combinations of fields, buttons, rules, rights, history, and tabs.

In addition, additional form pages can be generated from within a first page. For example, the selection of a tab can cause the dynamic generation of a second page that is also generated using the item model.

In one embodiment of the invention, an exemplary method for generating a page used to access a database begins by receiving input from a user. The input selects a particular form to be used in accessing the database. After the form is selected or otherwise identified, the first page is dynamically generated by accessing a corresponding item model. The generated page includes the relevant combination of fields, buttons, rules, rights, history, and tabs that are associated with the selected form. In addition, actual data may also be included in the generated page. Next, the page is displayed to the user. The use can then access the database using the dynamically generated form.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 is a screenshot illustrating an item list page that is dynamically generated after a search is executed from the item search page of FIG. 7;

FIG. 10 illustrates one embodiment of the item display definition included in an item model;

DETAILED DESCRIPTION OF THE PREFERRED EMBODIMENTS

Embodiments of the invention relate to systems and methods for dynamically generating forms used to access a database. As used herein, "access" a database includes, by way of example and not limitation, searching a database, editing objects or data in a database, adding objects or data to a database, deleting objects or data from a database, relating objects or data in a database, listing attributes or properties for objects or data in a database, and the like or any combination thereof.

Embodiments of the invention includes a set of forms that can dynamically adapt to different objects, thereby eliminating the need to create separate forms for each type of object. Embodiments of the invention include a data driven method that dynamically creates forms (also referred to herein as pages or form pages) based on a definition of an object in an item model. The definition of the object is stored in the tables of the relational database. Each object type is defined by a corresponding item model. As a result, using the definition stored in the item model enables the form pages to be generated dynamically. When a change is made to the database, the item model is altered as needed, and history of the change is captured. The resulting form pages automatically account for the change as they are dynamically generated.

Advantageously, there is one set of forms or pages that can be used for different objects because the forms use the corresponding item models to generate the form pages. The ability to dynamically create form pages is achieved, in one embodiment, by separating the actual data from the data types. As described above, each object type has a corresponding item model stored in the database. The item model defines the actual item data that is also stored in the relational database. The relational database stores both the item models and the corresponding data.

When a form is requested, the form can be generated by accessing the item model to identify what should be included in the form. If actual data is required, then the item data is accessed accordingly. When the database is improved, embodiments of the invention do not incur the cost of many changes to a multitude of forms. The item model can be changed to reflect the change and the dynamically generated form will then reflect the change.

In a conventional database, changes have to go through a rigorous process before being fully implemented. A conventional update requires the change to be specified, code needs to be updated, and the changes need to be tested. Embodiments of the invention can make improvements to the database in a significantly shorter time period because the change is made to the item model instead of to all of the conventional forms. Further changes made only to the item model are easily reversible.

Figure 1:
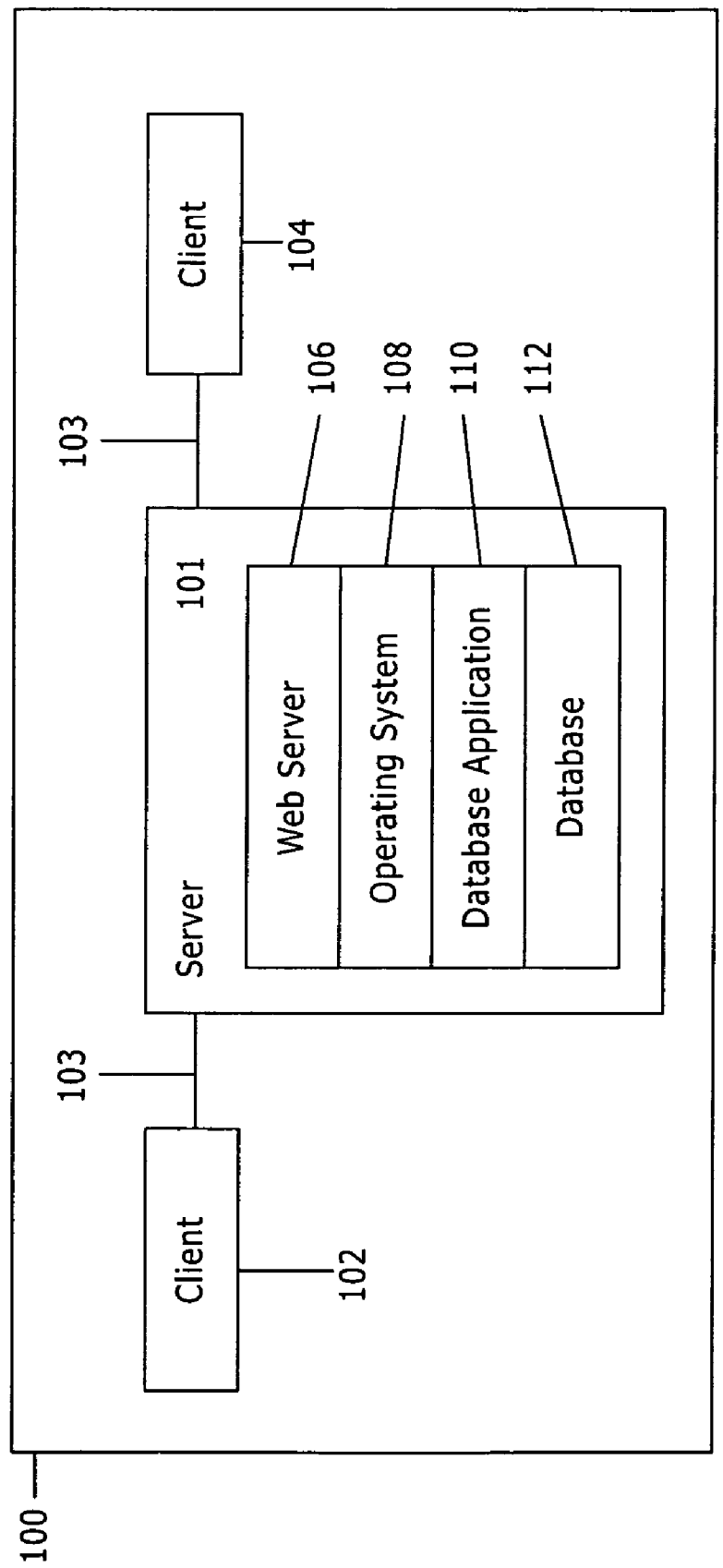
FIG. 1 illustrates an exemplary environment for implementing embodiments of the invention.

FIG. 1 illustrates an exemplary environment for implementing embodiments of the invention. FIG. 1 illustrates clients (represented by the client 102 and 104) that can connect to a server 101 over a connection 103. The connection 103 can be a local area network, a wide area network, the Internet, or any other suitable connection. In this example, the clients 102 and 104 are able to access and utilize the database application 110 using an internet, web browser. In other words, the database application 110 is a web or server based application that is accessible over a network connection 103.

The server 101 includes a web server 106 and an operating system 108 that operate together to provide the clients 102 and 104 with access to the application 110. The database 112 is accessed through the application 110. In one embodiment, the application 110 returns results to database queries in an XML format such that query results can be used by a variety of other applications.

The database 112, in this example, is a relational database and is used to store data as objects. Embodiments of the invention dynamically generate the forms or pages needed to access the database 112. When the client 102, for example, provides input that corresponds to a search request, the application 110 executes code that accesses the database 112 and generates the appropriate search page for the client 102. A user at the client 102 can then use the search page to provide information that is used to search the database 112. For example, once the page or form is filled out by a user, an appropriate database query is formed to search the data stored in the database.

Figure 2:
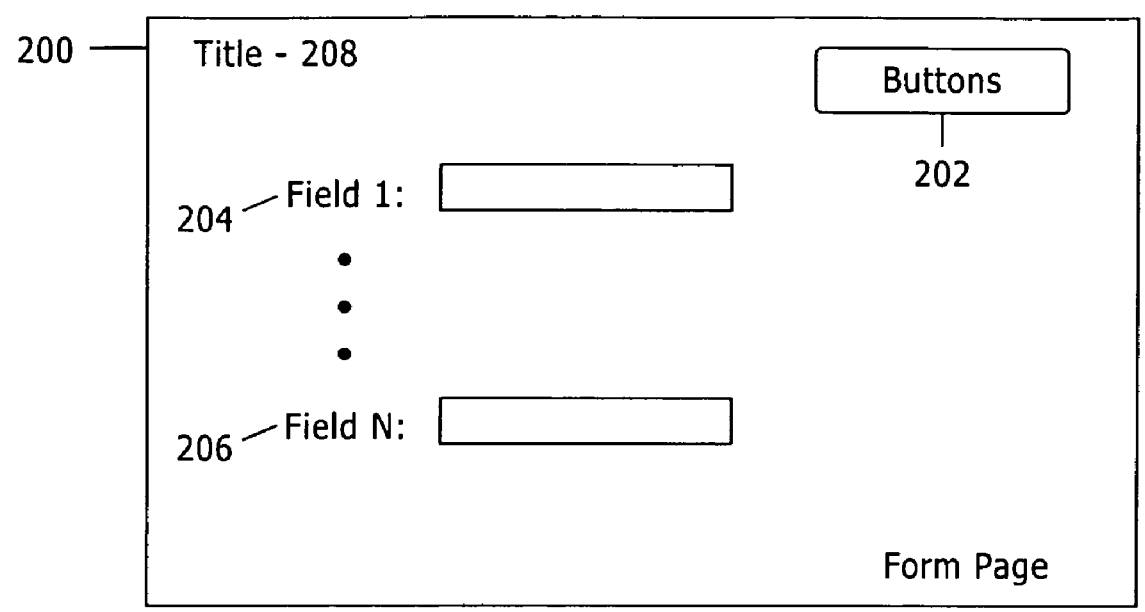
FIG. 2 illustrates an exemplary form that is dynamically generated in accordance with embodiments of the invention.

FIG. 2 illustrates an example of a typical form or page that may be generated dynamically by embodiments of the invention. A typical form 200 may include a title 208 that indicates the type of form (search form, insert form, edit form, delete form, relate form, etc.). The form 200 may also include fields 204 and 206. The fields 204 and 206 may be represented in a variety of different ways. The fields 204, and 206, for example, may be radio buttons, drop down lists, a check box, and the like or any combination thereof.

The form 200 may also include buttons 202 that are typically used to initiate an action. For example, the form 200 may be a search form. Once the fields 204 and/or 206 are filled or checked to identify the search parameters, then the buttons 202 or one of the buttons 202 initiates the search. As previously described, the application 110 or other module may generate an appropriate database query based on the information provided through the form 200. The query results can then be returned to the user.

Figure 3:
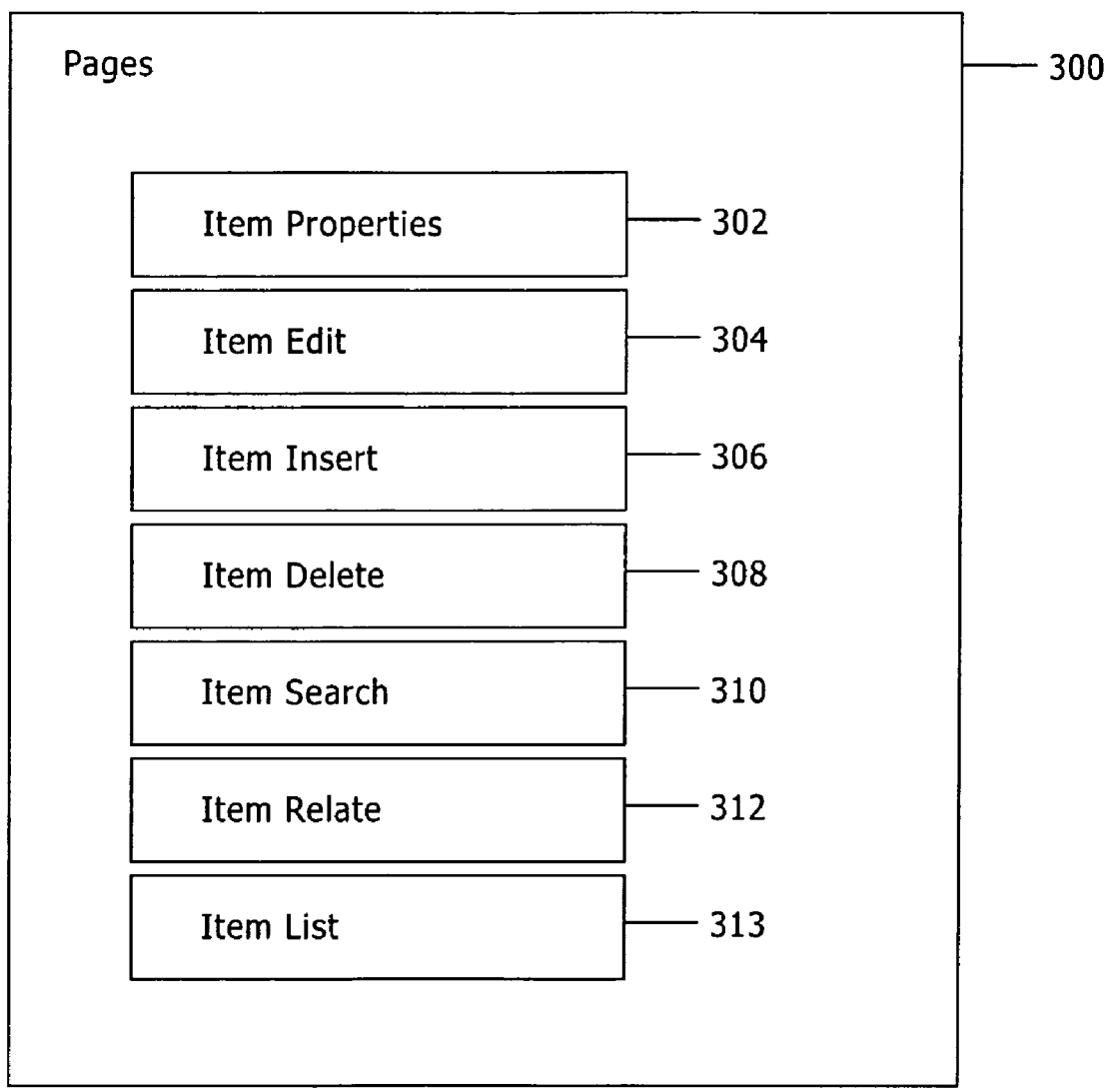
FIG. 3 illustrates exemplary forms that dynamically generate pages using at least an item model.

FIG. 3 illustrates exemplary forms or pages that can be dynamically generated by embodiments of the invention. The generated forms 300 include, by way of example and not limitation, item properties 302, item edit 304, item insert 306, item delete 308, item search 310, item relate 312, and item list 313. Each of the forms 300 is generated by corresponding code that is called to generate the forms 300. The code may use the context of previous pages to access the appropriate item model.

As previously stated, the dynamic generation of forms utilizes an item model and/or a data model. Whether the item model is accessed and/or the data model or actual data is accessed depends on the type of form being dynamically generated.

Figure 5:
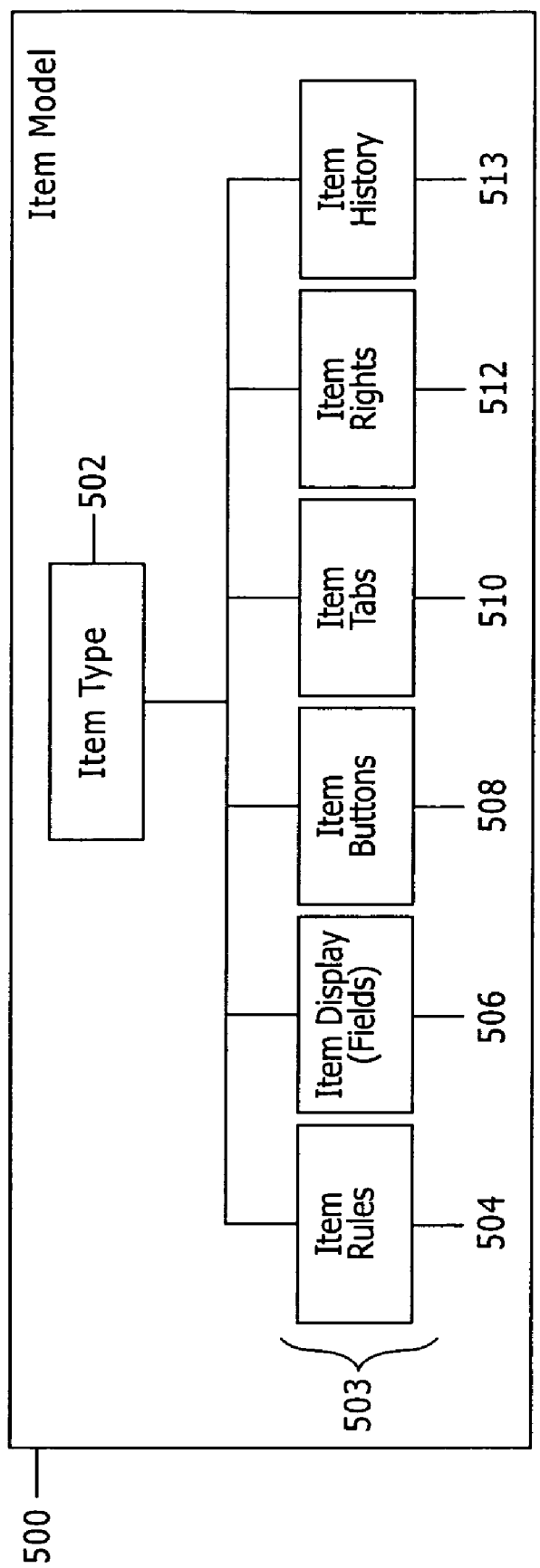
FIG. 5 illustrates one embodiment of an item model.

The dynamic form pages are generated using, in part, an item model 500 that is illustrated in FIG. 5. The item model 500 also illustrates an exemplary data structure that can be used in the dynamic generation of form pages for accessing a database. An item model 500 defines an item type 502. The item model 500 determines how the corresponding object should behave and how the dynamically generated page should behave. The item type 502 may identify, for example, an object type. The item type 502 may be, by way of example, a document, a part, a contract, a work order, an application, a drawing, a form, or any other type of object that can be stored in a database.

In this example, the item type 502 is associated with item definitions 503 that include item rules 504, item display 506, item buttons 508, item tabs 510, item rights 512, and history 513. One of skill in the art can appreciate that the item model 500 is not limited to or required to have the item definitions 503 illustrated in FIG. 5. The item model 500 can be expanded to incorporate additional definition or less definition. Further, the attributes or content of the definitions 503 can vary from one item type to another.

When a form 300 is called, it typically accesses the item model 500 to identify what should be included in the generated page. The form 300 may have context that directs it to particular portions of the definitions 503. For example, if the previous page was in the context of a contract object type, then an item search uses that context to generate a contract search page from the contract item type.

The definitions 503 define various attributes that may be included in the generated page. For example, if the item type 502 is contract, then the item display 506 includes the fields that describe the contract. Exemplary fields defined in the item display 506 may include, but are not limited to, length of the contract, parties contracting, contract number, and the like. The definition of the fields in the item display 506 can also include a description of the appropriate data for each of the fields. For instance, the contract number may be required to include numerical characters and have a certain length. The appearance of the fields can also be defined. In general, embodiments of the invention include the ability to define characteristics, look and feel, requirements, etc., of the attributes included in the item model 503, or in each of the definitions 503.

The item rules 504 are used to define event handlers on items. If certain events should happen as the result of a new item of a given type being inserted into the database, a rule can be set up to define the action (insert of an item), any conditions (particular attribute equal to a particular value) and any actions that must be taken when the event occurs under the specified conditions. For example, when inserting a contract type of item, if a list of point of contact has been defined, send an email message to point of contact informing them about the contract.

The item buttons 508 define the buttons associated with the. item type 508. When a particular button is selected, a corresponding action occurs. For example, a generated search page may include a search button that activates the search for information input to the search page. The item tabs 510 define the tabs that may be displayed for a given item type 502. Each tab can be used to generate additional pages for illustrating information regarding the selected object.

The item rights 512 can be used to implement security and user access permissions for a given item type 502. The item rights 512, along with other of the definitions 503, can be implemented in XML. An XML string can be understood and facilitates data exchange with other database systems.

The item history 513 can be used to track the history of changes to an item's attributes. When used, the previous attribute values of the item are stored, along with the person who made the changes and the date/time that the changes were made, such as if the period of performance on a contract is modified. Comparing two item history records or an item history record with the attributes stored in the properties table shows the specific items that were changed and who made those changes.

Figure 6:
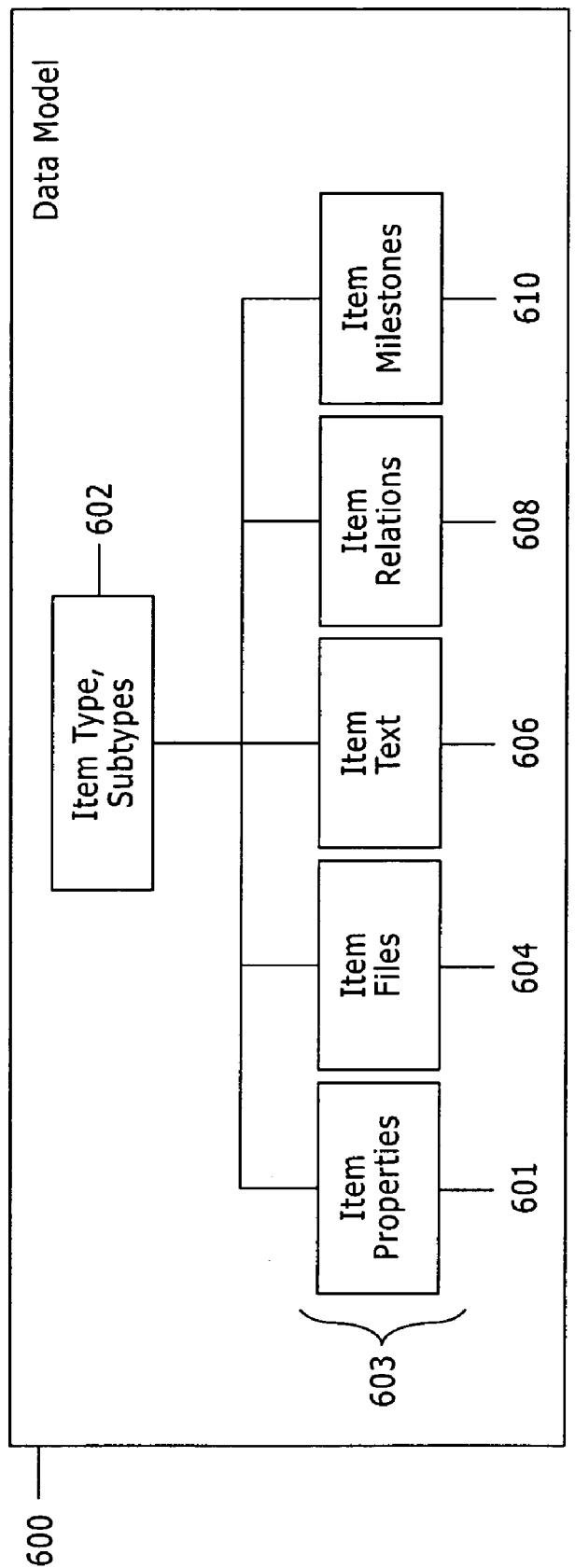
FIG. 6 illustrates one embodiment of a data model.

FIG. 6 illustrates a corresponding object or data model 600. An object 600, for example, includes an item 602 with an associated item type and/or sub-type. If the object is a contract, then the item 602 is the contract and the data items 603 provide additional information regarding the item 602. The item properties 601, for example, includes the properties (parties, contract length, contract number, payments, etc.) of the item 602. The item files 604 identify any files associated with the item 602, such as the actual contract binary file. The item text 606 may include notes or commentary related with the item 602. The item relations 608 identifies other data that is related to the item 602. The item milestones 610 may identify certain scheduled date achievements related to the item 602. One of skill in the art can appreciate that fewer or more data items 603 can be included in a particular data model 600.

Figure 4:
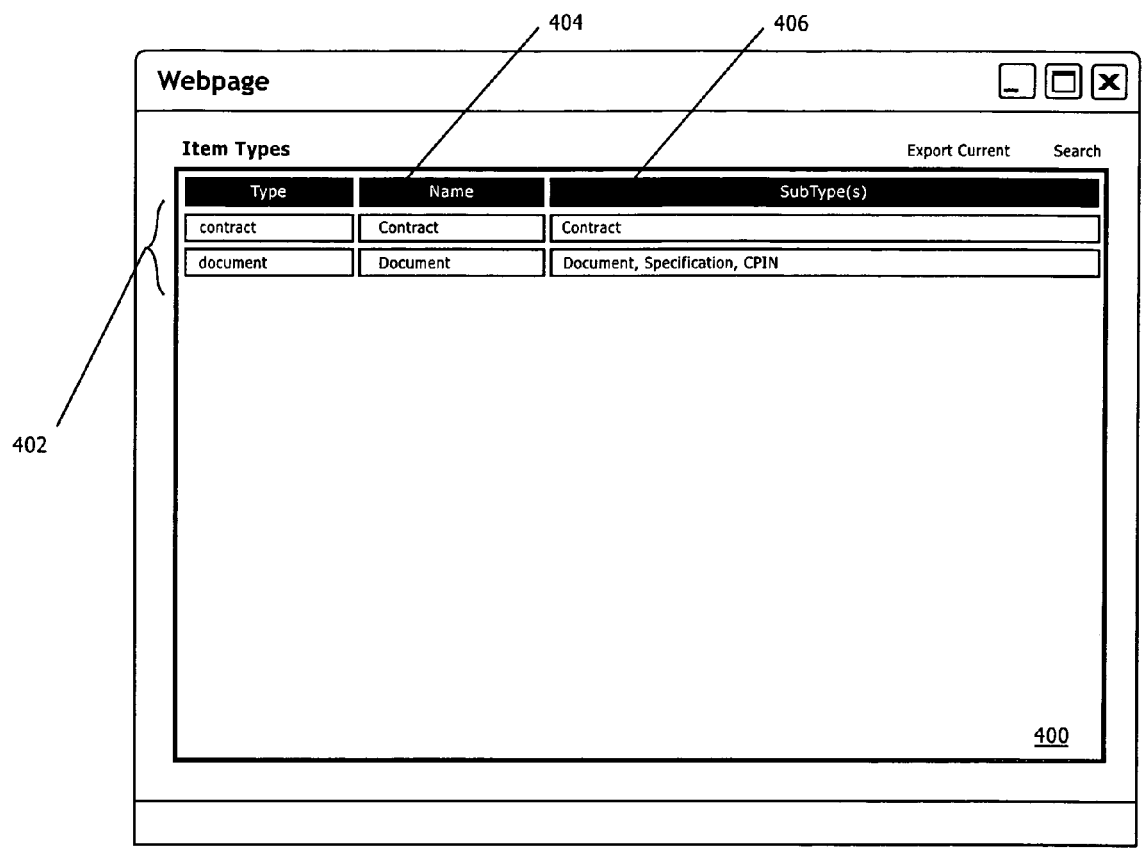
FIG. 4 illustrates one embodiment of an item type library that identifies item type, item name and item sub-types.
Figure 7:
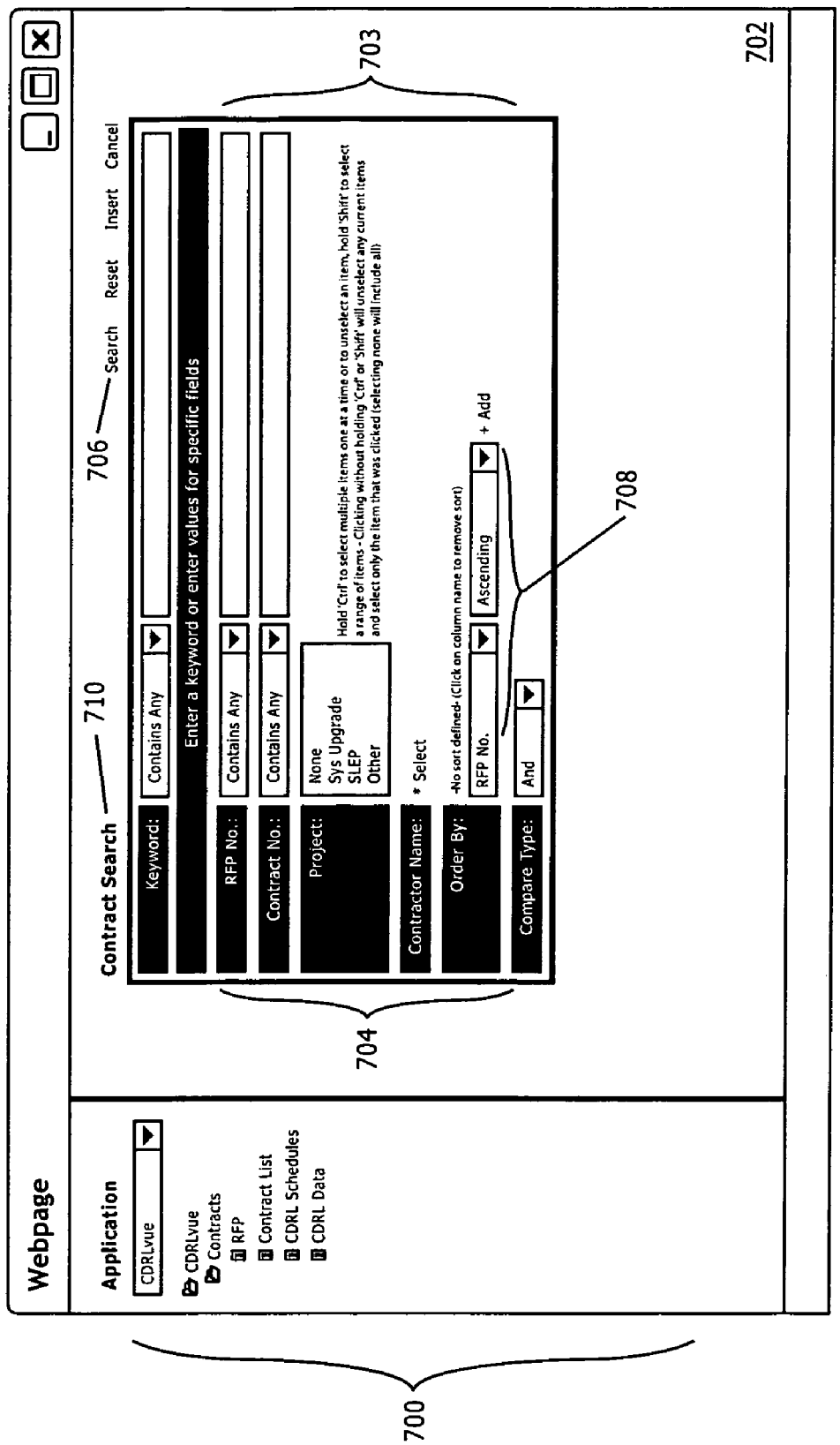
FIG. 7 is a screenshot illustrating an item search page that is dynamically generated for an item type of contract.
Figure 9:
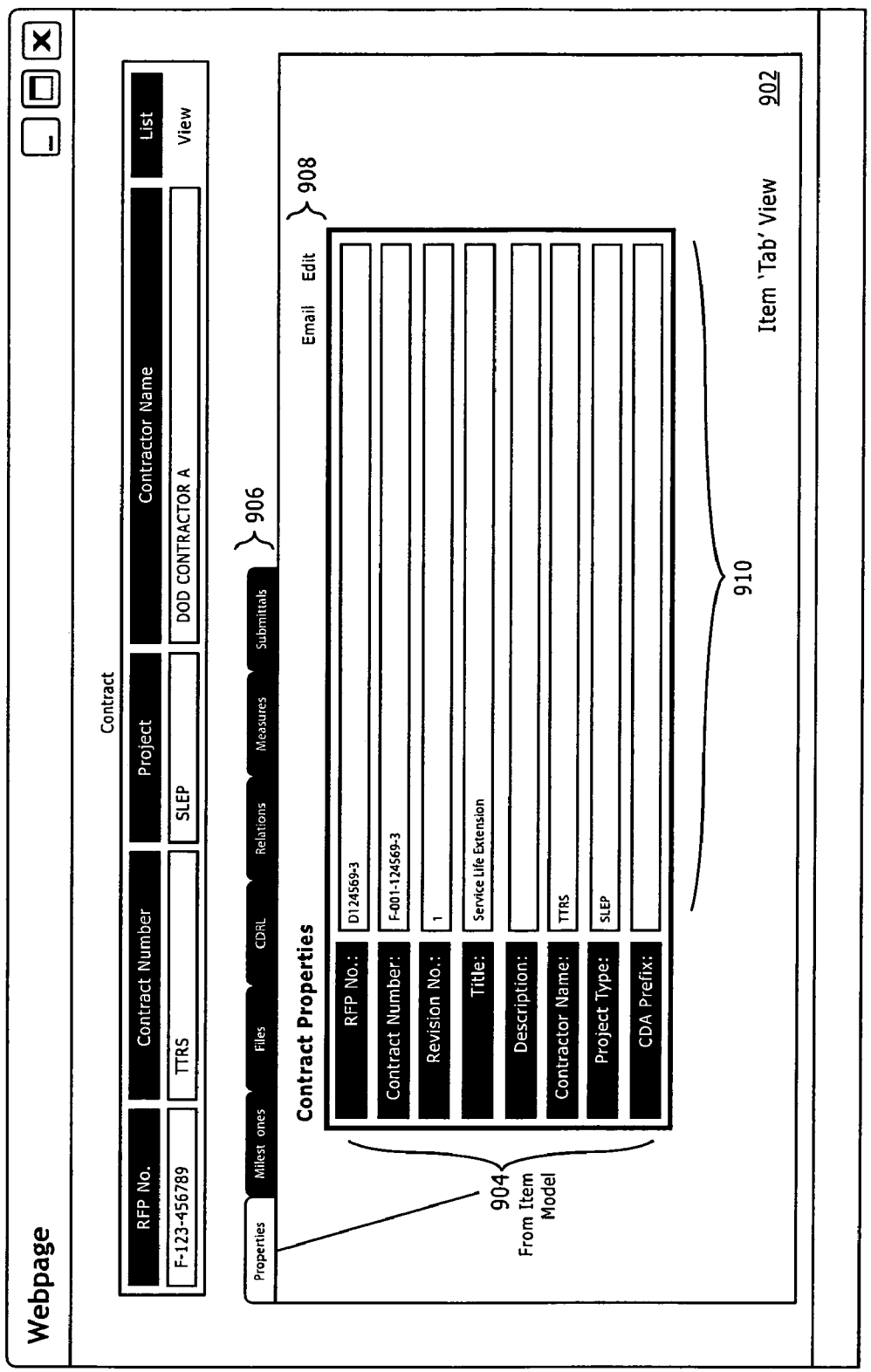
FIG. 9 is a screenshot illustrating a tab view of a particular contract, the tab view being dynamically generated from the item model and the contract object when a particular object illustrated in FIG. 8 is selected.

FIG. 4 illustrates an item type library 400. The library 400 lists the item types 402 along with a name 404 for each type 402. The library 400 also includes subtypes 406 for each item type 402. While FIGS. 7, 8 and 9 illustrate the dynamic generation for certain item types, the pages generated for the item types 402 will differ according to the corresponding item models as described herein. FIGS. 7, 8 and 9 illustrate pages that are generated by form code that accesses an item model and/or a data model (or a specific object(s)). FIGS. 7, 8, and 9 may also be described with reference to the item model of FIGS. 5 and the data model of 6. FIG. 7 illustrates the generation of a contract search page 702 where the item type is contract. The generation of the contract search page 702 begins when a user selects an application from a list 700 of applications. The selected application provides context and a container for associated item types that enable the database application 110 to select the appropriate form code used to generate the appropriate page 702. In this example, the selected application relates to contracts and the form code is item search 310 (see FIG. 3). Thus, the item search 310 is used to dynamically generate the page 702. Once a user selects an application at a client using, for example, a browser, this selection is sent to the server.

The database application 110 uses the selection to identify the form code that will dynamically generate the page 702. The information included in the page 702 is derived or retrieved from the item model for the item or object type of contract. The title 710 indicates that the page 702 is a contract search page. The fields 704 are obtained from the contract item model. The fields 704 may be stored in the item display 506 portion of the contract item model, for example. The item search 310 accesses the item display 506 of the contract item model 500 to identify the fields that should be displayed in the contract search page 702.

The information 703, in this example, may be included or identified from the item display 506 because this information 703 controls how the search page 702 is displayed. For example, the data 708 includes a pair of drop down boxes that are associated with the Order By field. The data 708 can control how the contracts are ordered after the contract search is performed. In other words, the item display 506 can control how fields are displayed on a form. Drop down boxes, radio buttons, check boxes, text or field requirements (alphanumeric, length, type, etc.), can be controlled using the item display 506.

The buttons 706 are defined in the item buttons 508. When the context is a contract search, then the buttons 706 defined are presented to the user in the search page 702.

FIG. 8 illustrates another page when the search button included in the buttons 706 is selected. In FIG. 8, the page 801 is generated using both the item model and the data that was found based on the search executed in FIG. 7. In this example, the data 804 represents data about the item and is defined in the item model 500. The actual data 802 is displayed under the data 804. The actual data 802 is not stored in the item model 500. In this example, the buttons 801 are also presented to the user.

FIG. 9 illustrates a page 902 that is presented when the user selects one of the contracts from the actual data 802. Once a specific contract is selected, the page 902 is dynamically generated. The properties 904 and the tabs 906 are obtained from the item model 500, while the data 910 is actual data from the corresponding object that is based on the object data model 600.

The properties 904 are defined in the item display 506 and are presented based on the context of the page 801, which is a request for a specific contract. The properties 904 are therefore displayed and any data that exists in the item properties 601 is displayed along side the appropriate properties 904.

The tabs 906 are also available and are identified using the item tabs 510. Each tab, when selected, causes the generation of another page that may have additional properties and data. For example, the tab milestones retrieves the attributes or properties associated with the item milestones 510 from the item model 500. Any milestones in the actual data would also be retrieved and displayed. The buttons 908, in this example, enable the contract properties to be edited or emailed. The selection of the edit button, for example, generates an edit page that is dynamically generated from the item model 500 and/or the data model 600.

FIGS. 7, 8, and 9 illustrate that pages can be dynamically created based on the definition of an object that is included in an item model. When one of the forms (properties, edit, insert, delete, search, etc.) is selected, the corresponding page is dynamically generated using at least the item model. Data from the object is accessed and included as needed for the specific page.

Figure 11:
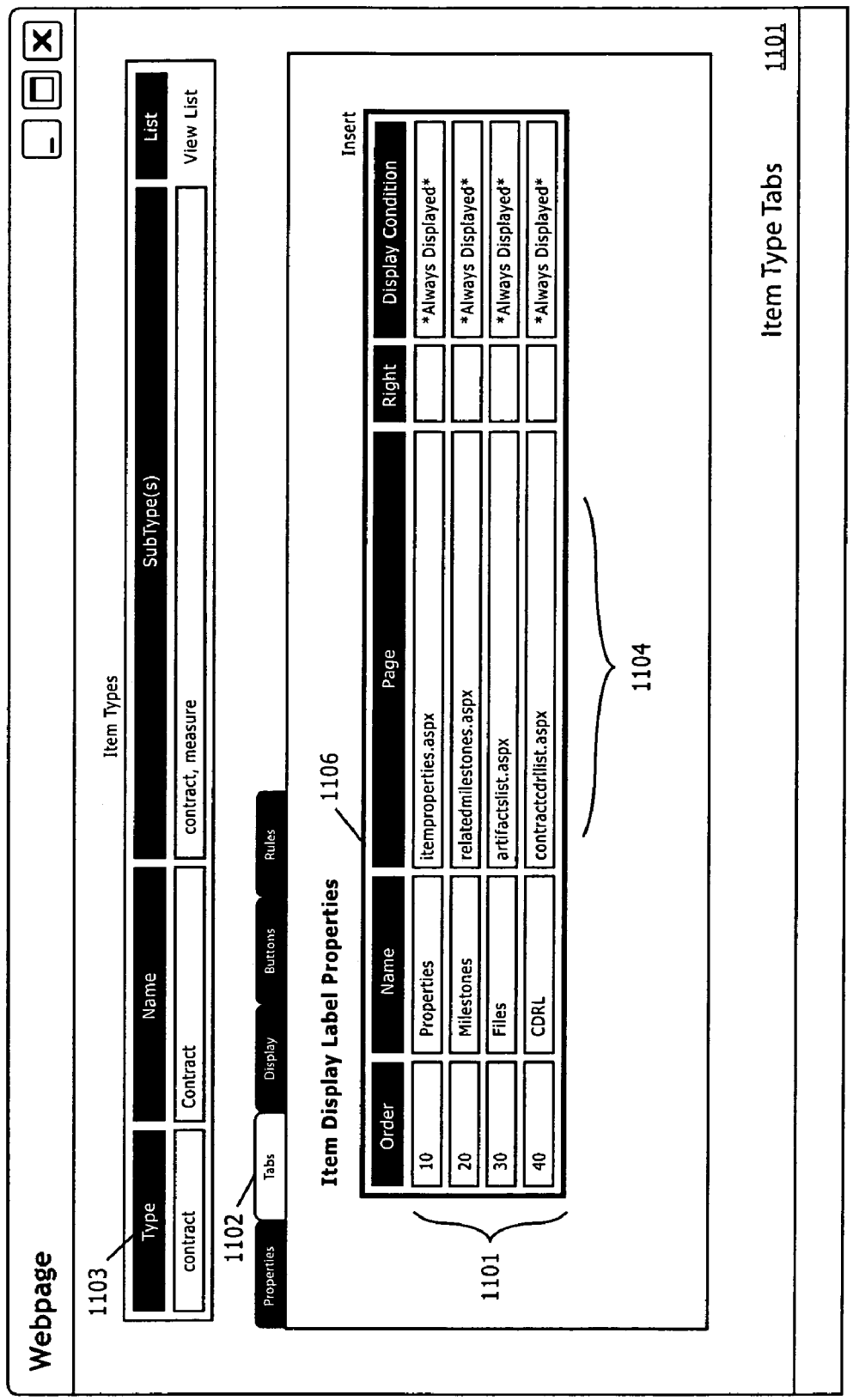
FIG. 11 illustrates one embodiment of the item tabs definition included in an item model.

FIGS. 10 and 11 illustrate examples of the item display 506 definitions and the item tabs 510 definitions included in an item model. FIG. 10 illustrates a page 1001 that displays the item type fields. The item display label properties 1002 includes properties of the object of type contract. The fields 1003 identify fields 1004 that are displayed in the page as well as the display names 1006. The required column 1008 indicates whether the field is required, the listed column 1010 indicates whether the field is listed. The field type column 1012 identifies a type for each field, and the sort order column 1014 dictates an order for display of the fields.

FIG. 11 illustrates an example of the item tabs 510. FIG. 11 illustrates a page 1101 that identifies the tabs 1102 for an item type contract 1103. The names 1106 of the tabs are in the table 1101. The code 1104 called when a particular tab is selected is also identified. The code 1104 can access, as described previously, the item model to dynamically generate the page for the selected tab.

Figure 12:
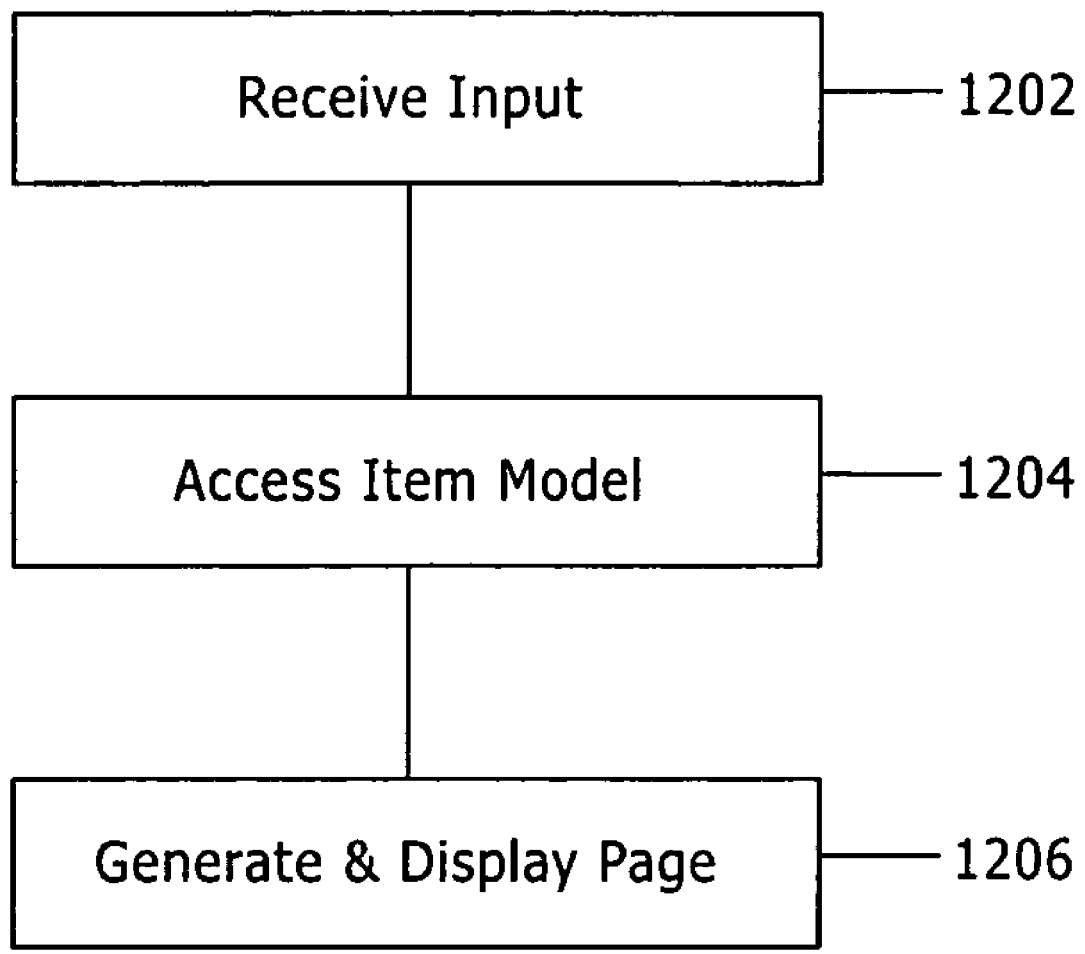
FIG. 12 illustrates an exemplary method for dynamically generating form pages for accessing a database.

FIG. 12 illustrates an exemplary method for dynamically generating form pages to access a database. A server hosting a database application 110 typically receives input 1202 that was provided by a user at a client. The input may be a request for a particular form page, for example, or may represent the selection of an application that identifies a particular item type.

Once the input is received by the database application, the item model is accessed 1204. The particular item model accessed depends on the object being accessed. Data of the object may also be accessed 1204. Once the definition of the page is identified from the item model, the page is generated and displayed on the client 1206. As previously described, the page includes links, buttons, and other aspects that can result in the dynamic generation of additional pages using the item model.

The present invention extends to both methods and systems for dynamically generating form pages. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically generating forms to access a database that stores a plurality of data objects of different types, the method comprising:
   receiving input from a user, wherein the input identifies an item type that is defined by an associated item model, wherein the database stores a plurality of item models each associated with a different item type and wherein each item model defines forms for the associated item type;
   accessing the item model associated with the item type to generate a first form, wherein the item model is stored in the database separately from the data objects and wherein the item model defines what is included in the first form;
   receiving second input from a user in the first form for accessing a database, the second input in the first form corresponding to an operation to be performed on at least one data object of the item type;
   accessing the item model associated with the item type of data objects in the database based on the second input, the item model identifying a plurality of information associated with the item type, and the manner in which the plurality of information is displayed to the user;
   dynamically generating a second form, wherein the plurality of information related to the item type is included in the second form according to the manner identified in the item model for the operation to be performed; and
   displaying the second form to the user, the second form enabling access to the data objects of the item type in the database according to the operation to be performed.

2. A method as defined in claim 1, wherein dynamically generating a second form further comprises accessing the item model associated with the item type identified from the second input.

3. A method as defined in claim 1, wherein accessing the item model associated with the item type to generate a first form further comprises at least one of:
   accessing item rules of the item model;
   accessing item display fields of the item model;
   accessing item buttons of the item model;
   accessing item tabs of the item model;
   accessing item rights of the item model, and
   accessing item history of the item model.

4. A method as defined in claim 1, further comprising formulating or generating a database query based on additional input received into the second form.

5. A method as defined in claim 4, further comprising returning results of the database query, wherein the results are in an XML format.

6. A method as defined in claim 1, wherein accessing the item model associated with the item type to of data objects in the database based on the second input further comprises at least one of:
   selecting a form for item properties;
   selecting a form for item edit;
   selecting a form for item insert;
   selecting a form for item delete;
   selecting a form for item search;
   selecting a form for item relate; and
   selecting a form for item list.

7. A method as defined in claim 1, wherein accessing the item model associated with the item type of data objects in the database based on the second input further comprises identifying a particular combination of rules, display fields, buttons, tabs, rights, and history to be included in the second form.

8. A computer readable medium having computer executable instructions for performing the method of claim 1, the computer readable medium including one of RAM, ROM, EEPROM, CD-ROM, optical disk storage, or magnetic disk storage.

9. A method for dynamically generating a form to access a database, the method comprising:
   accessing an item model associated with both a particular item type of data objects in the database and a particular form corresponding to an operation to be performed on at least one data object of the particular item type, wherein the item model is stored in the database with the data objects, wherein the data objects in the database are of multiple item types and wherein the particular item type is determined from user input;
   identifying one or more of rules, display fields, buttons, tabs, rights, or history in the item model that are associated with the particular form and particular item type; and
   dynamically generating the particular form using the one or more of rules, display fields, buttons, tabs, rights, or history included the item model, wherein changes to the item model are reflected in subsequent dynamic generations of the multiple forms associated with the item model including the particular form without having to recreate the particular form in response to the changes.

10. A method as defined in claim 9, wherein accessing an item model associated with both a particular item type and on a particular form further comprises receiving the user input from a user that identifies the particular form.

11. A method as defined in claim 10, wherein receiving the user input that identifies the particular form further comprises one or more of:
receiving input that identifies the particular form for item properties;
receiving input that identifies the particular form for item edit;
receiving input that identifies the particular form for item insert;
receiving input that identifies the particular form for item delete;
receiving input that identifies the particular form for item search;
receiving input that identifies the particular form for item relate: and
receiving input that identifies the particular form for item list.

12. A method as defined in claim 10, further comprising receiving additional input from a user into the first form.

13. A method as defined in claim 12, further comprising generating a database query based on the additional input.

14. A method as defined in claim 13, further comprising returning results to the database query in an XML format.

15. A method as defined in claim 9, wherein identifying one or more of rules, display fields, buttons, tabs, rights, or history in the item model that are associated the particular form further comprises at least one of:
accessing item rules to identify rules associated with the particular form;
accessing item display to identify display fields to be included in the first page;
accessing item buttons to identify buttons to be included in the first page;
accessing item tabs to be included in a tab view of the first page;
accessing item rights to establish a security of the first page, and accessing item history to capture item attribute changes of the first page.

16. A method as defined in claim 15, further comprising generating a second form based on input received from the user in the first form, wherein generating the second form further comprises accessing the item model.

17. A method as defined in claim 16, further comprising accessing actual data based on the definitions in the item model, wherein the actual data is included in the second form.

18. A method as defined in claim 9, wherein dynamically generating the particular form by accessing at least the item model and a data model.

19. A computer readable medium having computer executable instructions for performing the method of claim 9, the computer readable medium including one of RAM, ROM, EEPROM, CD-ROM, optical disk storage, or magnetic disk storage.

20. A method for dynamically generating form pages to access a database, the method comprising:
determining an item type that identifies a type for an item model, wherein the item model is saved in the database separately from actual data for objects of the item type, the item model identifying one or more fields associated with the item type, one or more actions associated with the item type, and the manner in which the one or more fields may be displayed to a user;
dynamically generating a first page based on the item type and defined by the item model;
displaying on a display the first page based on the item model using an item display that identifies the one or more fields to be displayed in the first page used to access a database, wherein the one or more fields are displayed in the first page according to the item model and wherein actual data is displayed alongside of the one or more fields, the actual data retrieved from an object that is separate from the item model; and
including item buttons that identify buttons to be displayed in the first page, wherein at least one item button causes the dynamic generation of a second page according to the one or more actions associated with the item type included in the item model, wherein the second page enables a query of the database according to an operation identified in the first page.

21. A method as defined in claim 20, further comprising an item rule that defines a behavior of the item type when displayed in the first page.

22. A method as defined in claim 20, further comprising item tabs that are displayed in a tab view of the first page, wherein each tab defined in the item tabs dynamically generates another page based on additional definitions included in least the item model.

23. A method as defined in claim 20, further comprising item rights that provide security to data displayed in the first page.

24. A method as defined in claim 23, wherein the security included in the item rights is described in an XML format.

25. A method as defined in claim 20, further comprising item history that provides attribute change tracking in the first page.

* * * * *